R. S. SMITH.
ELECTRODE FOR ARC WELDING.
APPLICATION FILED DEC. 6, 1918.
1,301,331.
Patented Apr. 22, 1919.
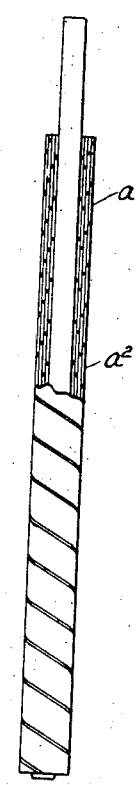
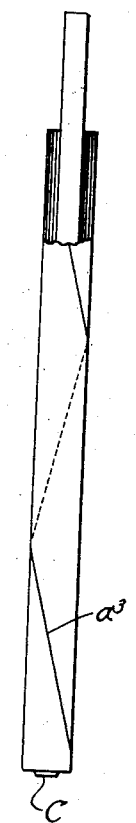
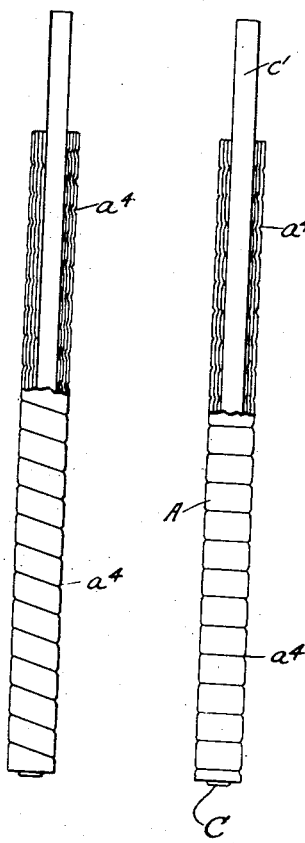
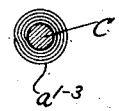
INVENTOR
REUBEN STANLEY SMITH
BY
W. F. Woolard.
ATTORNEY

UNITED STATES PATENT OFFICE.

REUBEN STANLEY SMITH, OF MILWAUKEE, WISCONSIN.

ELECTRODE FOR ARC-WELDING.

1,301,331.        Specification of Letters Patent.        Patented Apr. 22, 1919.

Application filed December 6, 1918. Serial No. 265,524.

*To all whom it may concern:*

Be it known that I, REUBEN STANLEY SMITH, a citizen of the United States, residing in the city of Milwaukee, in the county of Milwaukee and State of Wisconsin, have invented a certain new and useful Improvement in Electrodes for Arc-Welding, and do hereby declare that the following is a full, clear, and exact description thereof, such as will enable persons skilled in the art to which the invention pertains to make and use the same.

This invention relates to electrodes for use in arc-welding, of that type in which a metal electrode is fused or volatilized by the arc of the electric current, the molten or volatilized metal flowing from the electrode at the time of its fusion or volatilization being deposited at the jointure of and uniting with the surfaces to be welded.

In the development of the art of electric arc-welding, it has been the belief among inventors that fusible electrodes of the character referred to do not operate satisfactorily unless provided with a noncombustible, insulating covering formed of materials which by reason of their nature will admit of conversion into a slag at a rate of consumption about equal to that in which the electrode is fused or volatilized, and which prior to such conversion and closely following the fusion or volatilization of the electrode will form a crater or crucible in which the fusion or volatilization of the electrode takes place, and from which the fused or volatilized metal of the electrode is ejected and deposited upon the work to be welded.

The formation of the slag and its presence at the welding line have been regarded heretofore as necessary to the production of a satisfactory joint, it being alleged that the slag served to protect the molten or volatilized metal and the joint upon which it was deposited from deteriorating atmospheric influences.

Electrodes constructed as above described have been heretofore provided with coverings of various materials and compounds, which have had for their purpose the attainment of the results or effects noted. But such covering materials as have been heretofore used, are, in the main, expensive initially and also in their application to the electrode. My improved electrode obviates these objections, by reason of the simplicity of its construction and its economy in cost of materials and process of making.

After much experimentation, in my attempts to simplify methods of arc-welding and my desire to produce an entirely satisfactory electrode, I have found that an iron or steel wire provided with a covering of paper, which latter has been treated as hereinafter described, may be used as an electrode in the process of arc-welding, with excellent results, and I have found, also, that the coating of slag produced by the use of known covered electrodes is not essential to the production of eminently satisfactory work.

In one form of my invention, the wire constituting the electrode will be covered by winding and cementing thereon a sheet of paper, having a width sufficient to constitute a covering of necessary thickness for the electrode when wound thereon. The width of the sheet of paper and the consequent number of convolutions about the wire, will be in proportion to the gage of the wire used for the electrode, which latter is determined by the character of the surfaces to be welded. In another form, the winding about the wire will be formed as a helix from a comparatively narrow strip of paper, or a multiple number of strips of paper, simultaneously wound, may be used.

The sheet or strip of paper used as a covering is saturated or impregnated with sodium silicate, or other heat resisting compound, and such saturation may be effected by coating the paper with the solution prior to winding the paper about the wire, or the latter, after being covered with paper, may be placed in an ordinary vacuum impregnating apparatus to enable the necessary saturation to take place. After saturation, the electrode will be baked to expel a part of the moisture and harden the surface of the paper covering.

An electrode thus constructed is provided with an insulating coating or covering, which although combustible, disintegrates slowly under the action of the heat generated by the elecric-arc. The wire of the electrode fuses or volatilizes more quickly, and the molten or volatilized metal thereof flows from the crater or crucible formed by the coating to the work to be welded, and is deposited thereon and incorporated or amalgamated therewith. The covering of the electrode, having a carbon content, does not form a slag, but is charred by the flame of the electric arc, and falls away in minute particles, following closely the fusion or volatilization of the electrode. I have found by analysis that the joint thus produced is free from porosity, so that in using my improved electrode, I am enabled to effect a complete fusion and union of the surfaces to be welded, and thereby produce a joint which is free from oxidization, and of homogeneous structure, which tests show to be of maximum strength.

My invention further involves subsequent treatment, when desired, of an electrode prepared as above described so that even and uniform destruction of the covering thereof by the flame of the electric-arc will be assured, and the crater or crucible be preserved. This result is attained by creasing or scoring the covering of the electrode so as to compress or compact the material upon a line extending circumferentially or helically around the electrode. The principal object of this is to secure uniformity in the density of the coating on all sides and thus prevent the coating from disintegrating faster on one side than on another to such an extent as to destroy the crater. The creasing or scoring also tends to retard the transmission of heat and affords a means whereby the disintegrated portions may become detached, assuring the maintenance of a crater rim of uniform or regular contour.

Difficulty has been experienced, with consequent loss of time, in instantly striking the arc between the electrode and the work at the commencement of the welding operation, which difficulty has been attributed to the use of too low a starting voltage. By coating the point of the electrode with a substance which will vaporize at a comparatively low temperature, such vapor at the same time affording a good conductor for the passage of the arc, I have been able to entirely overcome the objection. I have found barium peroxid to be a very satisfactory substance for tipping the electrodes, as described, although there are many other materials having the qualities described, which would be suitable.

At the time of baking the treated electrodes, the moisture near the surface is expelled, and the cover so hardened retains a certain residuum of moisture which does not escape, but is reserved within the hardened cover produced by the baking process. As the welding operation progresses this residuum of moisture is vaporized by the heat of the arc, this vaporization helping to retard the fusion or volatilization of the electrode to an appreciable degree, and the arc is thereby enabled to exert a greater proportional heating effect upon the work to be welded, so that a more perfect fusion of the parts is attained.

Referring to the accompanying drawings:—

Figure 1 is a view in elevation, partly in section, showing my improved electrode as covered with a sheet of paper.

Fig. 2 is a similar view showing the electrode as covered with a plurality of narrow strips of paper.

Fig. 3 is a view like Figs. 1 and 2, but showing the electrode as covered with a single strip of paper.

Figs. 4 and 5, are views in elevation, partly in section, showing the manner of scoring or creasing the covering of the electrode helically and circumferentially, respectively, and showing the fiber of the covering as compacted at the scoring points.

Fig. 6 is a view in cross section showing the spiral winding of the paper covering, common to all forms of the electrode.

For convenience of illustration, the thickness of the paper is shown in all of the views as magnified.

In the drawings, Fig. 1, A indicates an electrode produced by winding a sheet of paper $a$, about a wire C, the latter forming the core of the fusible electrode. The sheet of paper should be somewhat shorter than the wire, so as to leave an uncovered portion $c^1$, by means of which the electrode may be attached to the winding devices and also to the carrier of the feeding devices employed in the welding apparatus. The sheet of paper will have a width sufficient to permit it being wrapped or wound around the wire the desired number of times to constitute a carrier for the requisite amount of sodium silicate, which will be determined by the character of the work to be welded. In work now being performed in connection with the manufacture of aerial bombs, I have found that a sheet of paper about two one-thousandths of an inch in thickness turned eight times around an 8-gage wire will absorb and retain a sufficient amount of the solution. But as before indicated, the gage of the wire and the number of windings will be proportioned in accordance with the particular work to be performed.

In preparing an electrode of the type indicated in Fig. 1, a rectangular sheet of paper of suitable dimensions is cemented at one edge of the wire, and the face of the sheet is then treated with sodium silicate, the latter being conveniently applied with a brush and spread evenly over the exposed face of the sheet, so that the latter will be covered with the solution, after which the sheet will be closely wound about the wire. The electrodes so treated are afterward subjected to baking to expel the moisture and harden the covering, and an electrode is thereby produced with a coating constituted of a tubular covering of hardened fiber, which is impregnated with sodium silicate. Electrodes constructed as indicated in Fig. 2, are covered with a plurality of narrow strips of paper, $a^2$, applied at one winding. In Fig. 3 the electrode is covered with a single strip of paper, $a^3$, the windings being lapped over each other, in the manner shown.

Although I prefer to impregnate the electrodes as above described, I have found it to be entirely practicable to cover the wire with a sheet or strip or strips of paper, the latter being cemented to the wire, and then place the electrodes in a vacuum impregnator to accomplish the desired saturation of the paper covering. The electrodes constructed in this last mentioned manner, will be baked, as in the first instance.

The electrode will be of selected wire, possessing the characteristics which best adapt it to the particular work to be performed. By covering the electrode wire with plain paper, I have provided most economically a satisfactory medium for carrying the sodium silicate, and which as a covering admits of ready application of the wire.

In practice, the electrode will be fed automatically to the work in the determined ratio of the consumption of the electrode as the welding proceeds, and as hereinbefore indicated, the consumption of the electrode and the destruction of the covering therefore are progressive, the former slightly leading the latter, so that a crater or crucible is formed in the covering, in which the electrode is fused or volatilized, and from which the molten metal is thrown by the arc upon the parts being welded. The parts to be welded are brought to a welding heat at the point of traverse of the current, coincident with the fusion or volatilization of the electrode.

To bring about the even and uniform destruction of the covering of the electrode and at the same time preserve the crater or crucible, I score the covering helically or circumferentially throughout its length, as indicated at $a^4$, and shown in Figs. 4 and 5. This scoring may cut but preferably merely indents the surface, and further compacts the covering materials at the line of pressure, so that in feeding the electrode at the time of welding, any tendency to burn the covering unevenly is retarded or arrested at the scored line, which latter forms a point at which the disintegrated portions of the covering will readily separate from the body thereof, as the fusing or volatilization of the electrode and the destruction of its cover progress. In practice, I rotate the electrode shown in Fig. 4, against an axially movable marking device which scores the covering with a helical line or thread of about $\frac{3}{16}''$ pitch. The electrode shown in Fig. 5, is scored circumferentially by a series of marking devices, or both forms may be scored by the dies of a stamping press.

In Figs. 4 and 5, I have shown the covering of the electrode as partly cut away to make clear the effect of the scoring or creasing upon the structure thereof. It will be observed that at the points or line at which the scoring or creasing is applied, the fibers of the covering of the electrode are compacted or condensed, so as to create points of resistance which act to increase the insulation and thereby serve to retard the transmission of the heat.

The covered electrodes are baked for the purpose of dispelling a large proportion of the moisture present, but also with the idea of hardening the exterior of the covering to form a moisture proof casing or shell, which will serve to retain a certain residuum of moisture within the covering. This residuum of moisture within the electrode acts very materially to reduce the temperature of the wire during the arcing process, thereby enabling the work to receive a greater proportional heating effect. The importance of this will be better understood if it is explained that were it not for this heat retarding effect of my coated wire, the metal of the electrode would be quickly fused and deposited on the relatively cold surfaces of the work in small drops or globules which would not flow or amalgamate as is desired. Whereas, by producing a coating which contains a residuum of moisture or other heat absorbing or dissipating medium, I am enabled to maintain an arc from a relatively easily fusible metal rod, the fusion of which is actually retarded to a degree which will permit the work to be brought to a high fusing temperature even when it is of considerable mass and has relatively great heat dissipating qualities in the way of convection or radiation.

It will be understood that while I prefer to incorporate a residuum of moisture to attain this end, inasmuch as water has a very high specific heat and therefore through vaporization absorbs and dissipates a considerable amount of heat, that this result may be accomplished in various ways, as, for instance, through the vaporization or volatilization of other substances than water, or by other known chemical reaction. While it has been the endeavor of other inventors to add to the electrode coating various substances which would increase the arc temperatures, I believe no one has made an attempt to produce a coating of such a nature that an arc might be maintained with a decreased or retarded volatilization of the electrode metal.

Upon disintegrating, the covering creates an atmospheric medium which is a conductor for the arc, yet which is of sufficiently high resistance to produce the desired temperature for the fusion or volatilization of the electrode, as well as the fusion of the parts to be welded.

To facilitate the establishment of the arc between the electrode and the work at the commencement of the welding operation, I apply to the tip of the electrode a coating of barium peroxid, which vaporizes at a comparatively low temperature and creates a medium through which the arc readily flows. The immediate rise in temperature to the point of fusion or volatilization of the electrode creates a vapor of high resistance which thereafter forms the medium by which the flow of the arc is maintained uninterruptedly during the welding operation. While I have referred to barium peroxid as employed to facilitate the establishment of the arc, it is apparent that the tip of the electrode may be treated with any other substance which will, upon vaporization by the heat of the arc, produce an arcing atmosphere of low resistance and low heating capacity.

It will be understood, however, that after having established the arc and brought the temperature up to the fusion point of the metal, it is then preferable to have an arcing atmosphere of very high resistance, and therefore high heating capacity. This is the effect produced by an electrode coated with paper and treated as described, the atmosphere produced by the decomposition of the substances in the arc being of extremely high resistance and yet of sufficient conductivity to preserve the arc at the high temperature attained.

While I have specified sodium silicate as being used to impregnate the paper covering of my improved electrode, it is to be understood that any chemical possessing heat resisting properties and which will produce an atmosphere of proper electrical resistance, when vaporized by the heat of the electric arc, may be employed.

Having now described my invention, what I claim and desire to secure by Letters Patent is:—

1. An electrode for use in arc-welding, consisting of a metallic rod having thereon a covering of paper treated with a heat resisting compound.

2. The electrode described in claim 1, the covering of such electrode being scored or compressed around its surface to form a heat resisting line.

3. The electrode described in claim 1, the tip of such electrode being coated with an arc starting substance.

4. An electrode for use in arc-welding, consisting of a metallic rod provided with a chemically treated covering of hardened paper, substantially as described.

5. The electrode described in claim 4, the covering of such electrode being scored or compressed around its surface to form a heat resisting line.

6. The electrode described in claim 4, the tip of such electrode being coated with an arc starting substance.

7. An electrode for use in arc-welding, consisting of a metallic rod having thereon a hardened covering of paper treated with sodium silicate.

8. The electrode described in claim 7, the covering of such electrode being scored or compressed around its surface to form a heat resisting line.

9. The electrode described in claim 7, the tip of such electrode being coated with an arc starting substance.

10. An electrode for use in arc-welding, consisting of a metallic rod provided with a covering or coating which is scored or compressed around its surface, to form a heat resisting line.

11. The electrode described in claim 10, such electrode having its tip coated with an arc starting substance.

12. An electrode for use in arc-welding, consisting of a metallic rod having thereon a covering treated with a heat resisting compound such as sodium silicate, the covering of the electrode being scored around its surface to form a heat resisting line.

13. The electrode described in claim 12, the tip of such electrode being coated with an arc starting substance.

14. An electrode for use in arc-welding, consisting of a metallic rod provided with a hardened covering conserving a residuum of moisture.

15. An electrode for use in arc-welding, consisting of a metallic rod provided with a coating or shell acting to retard the heating of said rod by the arc.

16. An electrode for arc-welding, consisting of a metallic rod having a coating containing a heat dissipating or dispelling medium.

17. A covered metallic electrode for use in arc-welding, having a starting tip of different material.

18. A fusible metallic electrode for use in arc-welding, having a starting tip of different material.

In testimony whereof, I affix my signature this 27th day of November, 1918.

R. STANLEY SMITH.